United States Patent [19]

Tanaka

[11] 4,396,951

[45] Aug. 2, 1983

[54] SOLID-STATE IMAGING APPARATUS PROVIDED WITH AUTOMATIC IRIS CONTROL MEANS

[75] Inventor: Takanori Tanaka, Tokyo, Japan

[73] Assignee: Nippon Electric Co., Ltd., Tokyo, Japan

[21] Appl. No.: 276,476

[22] Filed: Jun. 23, 1981

[30] Foreign Application Priority Data

Jun. 23, 1980 [JP] Japan ................... 55-84757

[51] Int. Cl.³ .............................................. H04N 5/26
[52] U.S. Cl. ................................................... 358/228
[58] Field of Search ........................ 358/228, 212, 213

[56] References Cited

U.S. PATENT DOCUMENTS 4,327,378 4/1982 Tanaka et al. ...................... 358/228

Primary Examiner—Richard Murray
Attorney, Agent, or Firm—Laff, Whitesel, Conte & Saret

[57] ABSTRACT

A solid-state imaging apparatus has an optical iris and a CCD imaging device which responds to light received from an object for producing a picture signal component and a reference black level signal component. A limiter limits the amplitude of the black level component to less than a predetermined value and the amplitude of the reference black level signal component is higher when the CCD imaging device is receiving such a quantity of light that the electric charges generated by photo-charge conversion in the light-sensitive elements in the CCD imaging device may not overflow from the light-sensitive elements. The limited amplitude is lower than the amplitude of the reference black signal component when the electric charges generated by photo-charge conversion in the light-sensitive elements overflow from the light-sensitive elements. A clamp circuit clamps the output from the CCD imaging device derived after passing through the limiter so that the reference black level signal component may take a predetermined voltage. An iris control circuit responds to the output of the clamp circuit for controlling the optical iris when the electric charges generated by photo-charge conversion in the light-sensitive elements in the CCD imaging device have overflown from the light-sensitive elements. The signal level of the reference black level signal component output from the limiter may be restored to the signal level of the reference black level signal component when the electric charges generated by photocharge conversion in the light-sensitive elements in the CCD imaging device do not overflow. The same conditions arises in the reproduced picture, at the moment when an excessively large quantity of light would be received by human eyes. Hence, a viewer of the reproduced picture does not have an unnatural feeling.

16 Claims, 12 Drawing Figures

SOLID-STATE IMAGING APPARATUS PROVIDED WITH AUTOMATIC IRIS CONTROL MEANS

The present invention relates to a camera employing a charge transfer imaging device (hereinafter referred to as "CTD imaging device"), and more particularly to means for automatically controlling a quantity of incident light to the CTD imaging device.

In an area imaging device formed of a CTD imaging device, a large number of light-sensitive elements are two-dimensionally arrayed in rows and columns. An electric charge corresponding to the quantity of incident light, sensed by the respective light-sensitive elements, is lead to a charge-voltage converter section by the use of charge transfer mechanisms. Depending upon the detailed structure of these charge transfer mechanisms, the CTD imaging device can be classified as a charge-coupled imaging device (hereinafter referred to as "CCD imaging device") or a bucket-brigade imaging device. Further, the CCD imaging devices can also be classified as an interline transfer system or a frame transfer system depending on their structure. In the interline transfer system, the respective columns of light-sensitive elements are associated with CCD shift-registers arranged parallel thereto. The electric charges generated in the light-sensitive elements are transferred to the respective CCD shift-registers to be further transferred to the charge-voltage converter section along the CCD shift-registers. On the other hand, in the frame transfer system, the light-sensitive elements themselves provide the functions of the CCD shift-registers. Hence, the generated charges are transferred along the respective columns of the light-sensitive elements to the charge-voltage converter section.

In a solid-state imaging apparatus equipped with one or more such CCD imaging devices, light emitted or reflected by an imaging object is projected via a lens to the CCD imaging devices. Electric charges corresponding to the quantity of light projected on the CCD imaging devices are derived from the CCD imaging devices and are converted into an electric signal having a voltage waveform. However, if the quantity of light projected into the CCD imaging device becomes too large, the light-sensitive elements are incapable of holding all the electric charges generated therein. Sometimes the charge generated in one light-sensitive element may flow into the surrounding light-sensitive elements. Therefore, the solid-state imaging apparatus in the prior art had a shortcoming in that unless the quantity of light received by the CCD imaging device is controlled, a reproduced image would tend to become white when an excessive quantity of light is received.

The above-mentioned short-coming is overcomed in the copending U.S. patent application Ser. No. 156,163, filed June 3, 1980 and now U.S. Pat. No. 4,327,378 assigned to the same assignee as this application. Therein is proposed an automatic iris control system in which overflow electric charges generated by light-sensitive elements in a CCD imaging device is detected. An iris associated with an optical lens is closed until the overflow of the electric charges disappears.

In such an automatic iris control system, a CCD imaging device is provided with a plurality of columns of shaded light-sensitive elements, positioned outside of its imaging section. Electric charges generated in these shaded light-sensitive elements are converted into an electric signal having a voltage waveform. When imaging is essentially normal, the shaded elements produce a reference black level signal.

The device disclosed in U.S. patent application Ser. No. 156,163 is also applicable to a CCD imaging device which is not provided with shaded light-sensitive elements. In such a device, after the electric charges for one row of picture elements have been converted into an electric signal, in the charge-voltage converter section, a similar charge-voltage conversion is effected once more for a period of one row in a picture without receiving electric charges from the light-sensitive elements. Thus, the resulting electric signal is used for producing a reference black level signal upon a normal imaging period.

Whichever type of CCD imaging devices is used, in the event that the quantity of received light is excessively large, the derived signal for producing a reference black level signal becomes an extremely high level as compared to that level which occurs during a normal imaging period. This is because the electric charge overflowing from the light-sensitive elements in the imaging section (due to the excessively large quantity of received light) is present over the entire semiconductor substate and thereby raises the level of the signal derived for producing the reference black level signal.

The excessively large amount of light received at the imaging section of the CCD imaging device is detected on the basis of the signal level of this reference black level signal. Upon such a condition, the iris is closed until the quantity of light received by the CCD imaging device, at the imaging section, is proper and hence normal imaging becomes possible.

In such an automatic iris control system, at the moment when the overflow of electric charges from the light-sensitive elements has occurred due to an excessively large quantity of received light, the signal levels of signals for producing the picture signal and for producing the reference black signal are equal to each other. As a result, the reproduced picture becomes entirely black. Thereafter, the normal picture can appear only when the overflow has been eliminated by the operation of the automatic iris control. Therefore, the reproduced picture suddenly becomes very dark despite the fact that a bright object is being picked up by the apparatus. The TV viewer then sees an unnatural image.

It is, therefore, one object of the present invention to provide a solid-state imaging apparatus having an automatic iris control means which quickly controls an iris without producing an unnatural feeling to a viewer of a reproduced picture image, when the apparatus has received an excessively large quantity of light.

According to one feature of the present invention, a solid-state imaging apparatus comprises an optical iris. A CCD imaging device responds to light received from an object for producing a picture signal component and a reference black level signal component. A limiter limits the amplitude of the reference black level signal component in the output signal from the CCD imaging device so that the limited level is lower than a predetermined value. The value of the black level signal is larger than the amplitude of the reference black level signal component when the CCD imaging device is receiving a quantity of light such that the electric charges generated by photo-charge conversion in the light-sensitive elements in the CCD imaging device do not cause overflow from the light-sensitive elements. However, the black level signal is smaller than the amplitude of the reference black level signal when the electric charges overflow generated as a result of photo-charge conversion in the light-sensitive elements, when there is an overflow from the light-sensitive elements and every light-sensitive element in the CCD imaging device holds an electric charge equal to or larger than its capacity. The apparatus further comprises a clamp circuit for clamping the output from the CCD imaging device derived after passing through the limiter so that the reference black level signal component may take a predetermined voltage. An iris control circuit is responsive to the output of the clamp circuit for controlling the optical iris. The iris is controlled when the electric charges generated by a photo-charge conversion in the light-sensitive elements in the CCD imaging device have overflown from the light-sensitive elements. The level of the reference black level signal component from the limiter may be restored to the level of the reference black level signal component, when there is no overflow of that the electric charges generated by photo-charge conversion in the light-sensitive elements in the CCD imaging device.

According to the present invention, even at the moment when electric charges have overflown from the respective light-sensitive elements, in response to an excessively large quantity of light received by the CCD imaging device, the amplitude of the reference black level signal is limited by the limiter. Therefore the reproduced picture does not become black, but is maintained as white. Starting from this white condition, the iris control becomes effective, and a picture appears gradually. Therefore, the same condition arises in the reproduced picture as arises in the human eye at the moment when an excessively large quantity of light has been received. Hence, a viewer of the reproduced picture does not have an unnatural feeling.

The above-mentioned and other objects, features and advantages of the invention will become more apparent from the description of a preferred embodiment thereof taken in conjunction with the accompanying drawings, wherein.

Figure 1:
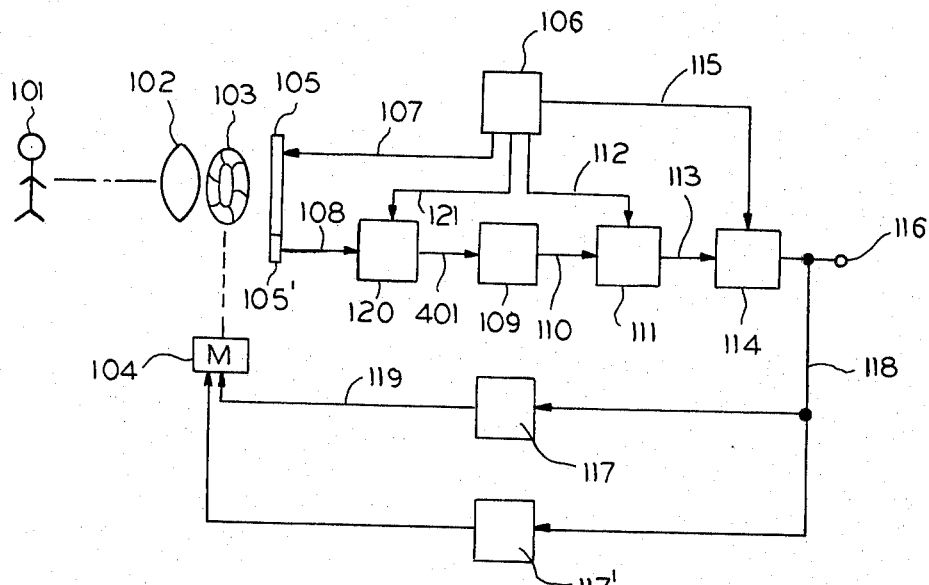
FIG. 1 is a block diagram of a solid-state imaging apparatus according to a preferred embodiment of the present invention.

FIGS. 3(a) to 3(d) are waveform diagrams showing signal waveforms appearing at various points in the solid-state imaging apparatus in FIG. 1, under the condition that that overflow of electric charges within the CCD imaging device does not occur; and FIGS. 4(a) to 4(e) are waveform diagrams showing signal waveforms appearing at various points in the solid-state imaging apparatus in FIG. 1, under the condition that the overflow of electric charges has occurred within the CCD imaging device.

In FIG. 1, the image of an object 101 is focused on a CCD imaging device 105 by means of a lens 102. A quantity of light emitted or reflected by the object 101 and received by the device is controlled by an optical iris 103 disposed behind the lens 102. The optical iris 103 can also be positioned in front of the lens 102. Electric charges generated in the respective light-sensitive elements within the CCD imaging device 105 are led to a charge-voltage converter section 105' by a drive signal issued from a drive circuit 106. Thus, an electric signal 108 is derived with a voltage waveform corresponding to the quantity of received light.

The derived electric signal 108 includes a signal component for a horizontal blanking period, a picture signal component and a reference black level signal component. This electric signal 108 is fed to a limiter 120, in which only the reference black level signal component has its amplitude limited responsive to a drive signal 121, applied from the drive circuit 106. The limiting level of the limiter 120 is of such value that it is larger than the amplitude of the reference black level signal component under the conditions when the electric charges generated in the light-sensitive elements within the CCD imaging device do not overflow. Hence the reference black level signal component is not influenced by the limiter 120 when overflow does not occur. Also, the limiting level is such that the amplitude of the reference black level signal component may be limited to a value which is smaller than the amplitude of the reference black level signal component when overflow has occurred in every light-sensitive element and when all the light sensitive elements hold electric charges up to their full capacity.

Therefore, the reference black level signal component has its amplitude limited by the limiter 120 only when an overflow of electric charges has occurred. The amplitude limiting level is preset, for instance, at a value that is by 0.1 V higher than the reference black level of the output of the CCD imaging device.

The limiter output 401 is converted into a signal 110, including a picture signal, and a reference black level signal. This conversion is by a first processor circuit 109 containing a preamplifier and a low-pass filter. This signal 110 is clamped by a clamp circuit 111 which is controlled by a drive signal 112 applied from the drive circuit 106. As claimed the level of the reference black level signal may coincide with a predetermined level, and thereby provide a video signal 113 having a reference level at the predetermined level.

This video signal 113 is subjected to further processings such as gamma correction, white clipping, black clipping, etc. A blanking signal and synchronizing signals are added to the video signal 113. These processings and signal additions are done in the second processor circuit 114, which is controlled by a drive signal 115 applied from the drive circuit 106. The signal is then output from an output terminal 116.

On the other hand, the video signal, having a reference level at the predetermined level, is applied from the output of the second processing circuit 114 to a control circuit 117 via a signal line 118. In the control circuit 117, when the average level of the video signal 113 is equal to or higher than a predetermined value, a signal 119 is applied to a motor 104 or to a meter indicating the overflow of the electric charges. The motor 104 responds to a signal 119 (applied from the control circuit 117) for closing the optical iris 103 to the extent that that overflow of electric charges stops in the CCD imaging device. The predetermined value to which the average level of the video signal 113 is to be compared in the control circuit 117 is typically selected as at the average level of the video signal 113, under the condition just before overflow occurs in the light-sensitive elements within the CCD imaging device. However, it could be selected at lower than such a critical value. To illustrate, it could be selected at 25~50%, (for example at 30%) of the peak video signal level upon overflow.

After the overflow of electric charges has been eliminated by the aforementioned iris control, another control circuit 117' controls the motor 104 to adjust the optical iris 103 opening so that the average video signal level may be continuously held at approximately a predetermined value. Alternatively, the control circuit 117 can be designed to operate in the non-overflow period in the same manner as in the charge-overflow period. In this design, the control circuit 117 adjusts the optical iris 103 to hold the average video signal level in the non-overflow period to approximately a predetermined value, and the other control circuit 117' can be eliminated.

Figures 2A, 2B:
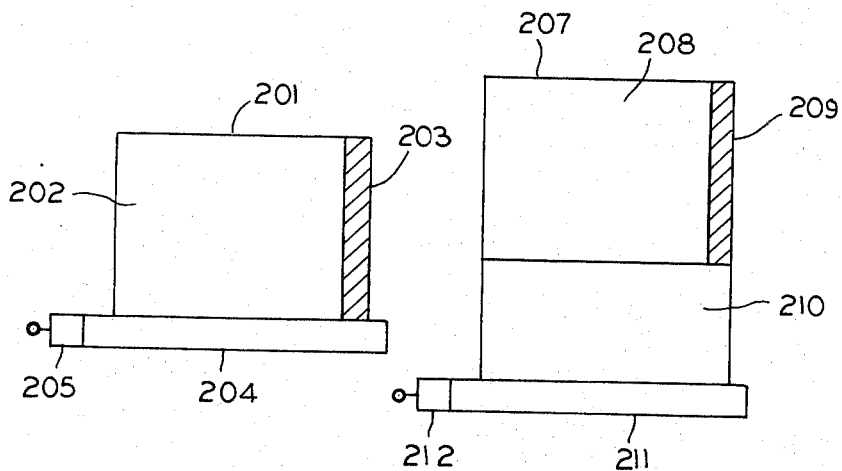
FIG. 2(a) is a schematic view of an interline transfer type CCD imaging device.
FIG. 2(b) is a schematic view of a frame transfer type CCD imaging device.

With regard to the type of the CCD imaging devices available for use in the above-described solid-state imaging apparatus, a known interline transfer system is shown in FIG. 2(a) and a frame transfer system is shown in FIG. 2(b). The interline transfer system of CCD imaging device 201 comprises a light receiving section 202 including a large number of light-sensitive elements arranged in a matrix form and a reference black level generator section 203 including a plurality of columns of shaded light-sensitive elements for deriving a reference black level signal component. The system also includes a horizontal charge transfer section 204 and a charge voltage converter section 205.

In the light receiving section 202 and in reference black level generator section 203, there are vertical charge transfer sections in parallel to the respective columns of light-sensitive elements. The electric charges generated in the light-sensitive elements are transferred via charge transfer means to the vertical charge transfer sections. The electric charges transferred via the charge transfer means to the vertical transfer sections are further transferred to the charge-voltage converter section 205 via the vertical charge transfer sections and the horizontal charge transfer section 204. Eventually, the electric charges are converted into an electric signal having a voltage waveform in the charge-voltage converter section 204.

On the other hand, the frame transfer system of CCD imaging device 207 comprises a light receiving section 208 comprising a large number of light-sensitive elements arrayed in a matrix form, a reference black level generator section 209 comprising of a plurality of columns of shaded light-sensitive elements, a memory section 210, a horizontal charge transfer section 211 and a charge-voltage converter section 212. Electric charges accumulated in the light receiving section 208 and reference black level generator section 209 are transferred along the respective columns of light-sensitive elements and stored in the memory section 210. Thereafter, the electric charges are successively transferred from the memory section 210 to the horizontal charge transfer section 211, and further transferred to the charge-voltage converter section 212. Eventually an electric signal having a voltage waveform can be derived at the output of the charge-voltage converter section 212.

Now a description will be made of the operation of the solid-state imaging apparatus when electric charges are not overflowing from the respective light-sensitive elements in the CCD imaging device 105. That is, there is no overflow when the CCD imaging device 105 is imaging an object with a proper quantity of light. With reference to FIGS. 3(a) to 3(d), this corresponds to operation with the proper quantity of light.

The output from the charge-voltage converter sectio 105' (FIG. 1) of the CCD imaging device 105 has the waveform shown in FIG. 3(a), in which one horizontal scanning period includes a horizontal blanking period $t_1$, an effective picture period $t_2$ and a reference black level signal period $t_3$. In the horizontal blanking period $t_1$, the waveform contains only a reset noise 301. In the effective picture period $t_2$, it contains a signal 302 corresponding to the quantity of received light. In the reference black level signal period $t_3$, it contains only an output 303 generated by a dark current, because the light-sensitive elements are shaded.

In the assumed case where an overflow of electric charges does not occur, the output of the CCD imaging device 105 (FIG. 1) is not at all affected by the limiter. After it has passed the first processing circuit 109, the signal takes a waveform 110 shown in FIG. 3(b). More particularly, the signal portion corresponding to the horizontal blanking period $t_1$ takes a level of 0 V; in the signal portion corresponding to the effective picture period $t_2$ takes the waveform shown in the period $t_4$ in FIG. 3(b); and the signal portion corresponding to the reference black level signal period $t_3$ takes a voltage level $V_1$ which is equal to about 2 to 5 m V, as shown in the period $t_5$ in FIG. 3(b). In response to a clamp pulse included in the drive signal 112 as shown in FIG. 3(c), the voltage level v, in this period $t_5$ is clamped by the clamp circuit 111 (FIG. 1) so that this voltage level $V_1$ may be used as a black level 304. In this way, a video signal 113, as shown in FIG. 3(d), can be obtained. In this case, normal iris control for automatically controlling the optical iris 103 maintains an average signal level of the video signal 113 at a constant value. The control is carried out by the control circuit 117'.

Next to be explained is the control of the optical iris 103 when the electric charges have overflowed from the light-sensitive elements in the CCD imaging device 105. This control will be explained with reference to FIGS. 4(a) to 4(e). As is well known, when the CCD imaging device 105 (FIG. 1) is subjected to irradiation of so intense a light that an excessive quantity of signal charges is generated in the respective light-sensitive elements responsive to the light. The quantity is extremely large, to the extent of exceeding the maximum quantity of charges which can be transferred by the horizontal charge transfer section 204 or 211 shown in FIG. 2. There is the phenomenon that the electric charges overflow toward the horizontal charge transfer section. If the quantity of the electric charges generated by the incident light becomes about several hundred times as large as the maximum quantity of light that can be transferred by the horizontal transfer section, the overflowed electric charges will fill the entire horizontal transfer section.

Figure 4:
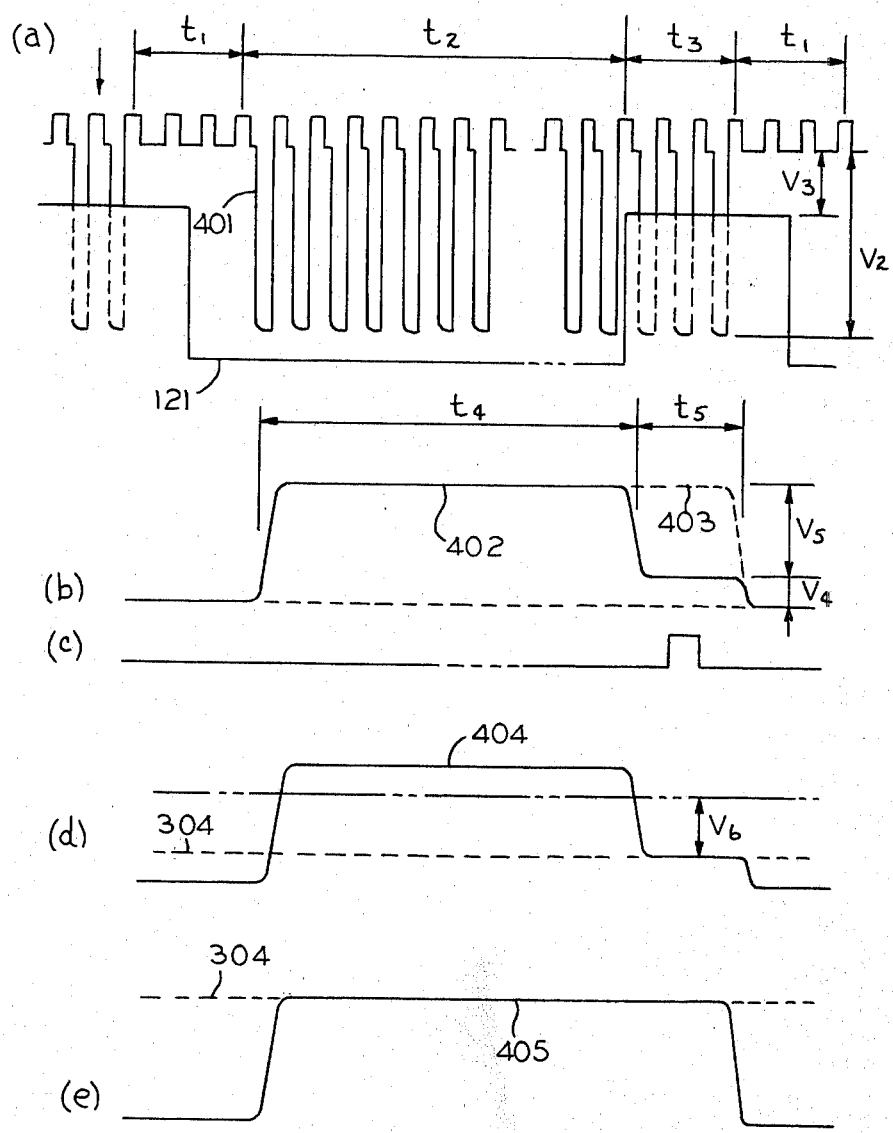

FIG. 4(a) shows an output signal waveform 401 issued from the CCD imaging device 105, under the condition described above. As will be seen from this figure, an extremely high output level appears even in the reference black level period $t_3$ because overflowing electric charges enter into the portion of the horizontal charge transfer section 204 or 211 (FIG. 2a) receiving charges from the reference black level generator section 203 or 209. Consequently, except for the horizontal blanking period $t_1$, an output signal uniformly having a large amplitude $V_2$ (for instance, 2 V) would appear at the output of the CCD imaging device 105 (FIG. 1). The limiter 120 is a circuit for limiting the amplitude of the signal 401 (FIG. 4) during the reference black level signal period $t_3$ in the case where such a large amplitude has appeared at the output of the CCD imaging device 105 (FIG. 1). It responds to a limiter control signal 121 for limiting the amplitude of the output signal in the reference black level signal period $t_3$ to a particular amplitude $V_3$ which may be selected, for example, at 0.1 V, as shown in FIG. 4(a).

When the amplitude-limited signal has been amplified by a preamplifier and has passed through a low-pass filter in the first processing circuit 109, a video signal 402, as shown in FIG. 4(b), can be obtained. A dashed line waveform 403, FIG. 4(b), represents a video signal in the case where the limiter circuit 120 is not provided and hence the amplitude is not limited. In such a signal, the signal in the period $t_5$, corresponding to the reference black level signal period $t_3$, has the same level as the signal in the effective picture period $t_4$. Accordingly, if this signal 403 is clamped by the clamp circuit 111 (FIG. 1), then the signal in the effective picture period $t_2$ is fixed at a black level 304 as shown by a dashed line associated with curve 405 in FIG. 4(e). This state is equivalent to the condition that no incident light is received by the CCD imaging device 105. Hence the conventional control circuit 117' for automatically controlling the quantity of incident light, depending upon the signal level of the video signal 402 (FIG. 4b) would malfunction in the direction of opening the iris 103.

However, according to the present invention, the video signal 402 shown in FIG. 4(b) has its amplitude (in the period $t_5$) limited to an amplitude $V_4$, by the limiter circuit 120. If this video signal 402 is clamped by the clamp circuit 111 which is controlled by a sampling pulse in a drive signal 112 as shown in FIG. 4(c), then a video signal 404 can be obtained with the signal level $V_4$ in FIG. 4(b) fixed at a black level 304, as shown in FIG. 4(d).

The video signal 404, shown in FIG. 4(d), has its average level compared with a reference level comprising the black level 304 plus an amplitude $V_6$. The comparison is in the control circuit 117. When the average level of the compared video signal 404 is higher than this reference level, the control circuit 117 operates in the direction of closing the optical iris 103. This particular amplitude $V_6$ could be selected equal to 20~50%, for instance, 30% of the amplitude of the video signal 404. These percentages are taken with respect to the black level 304 when the electric charges overflow from the light-sensitive elements in the CCD imaging device 105. Accordingly, when the electric charges overflow, the amplitude $V_6$ is smaller than the difference between the video signal level and the reference black signal level in FIG. 4(b). Then, the control circuit 117 acts to close the optical iris 103 to equalize the amplitude $V_5$ of the video signal level 404, with respect to the reference black signal level, equalization is with respect to the amplitude $V_6$.

Figure 3:
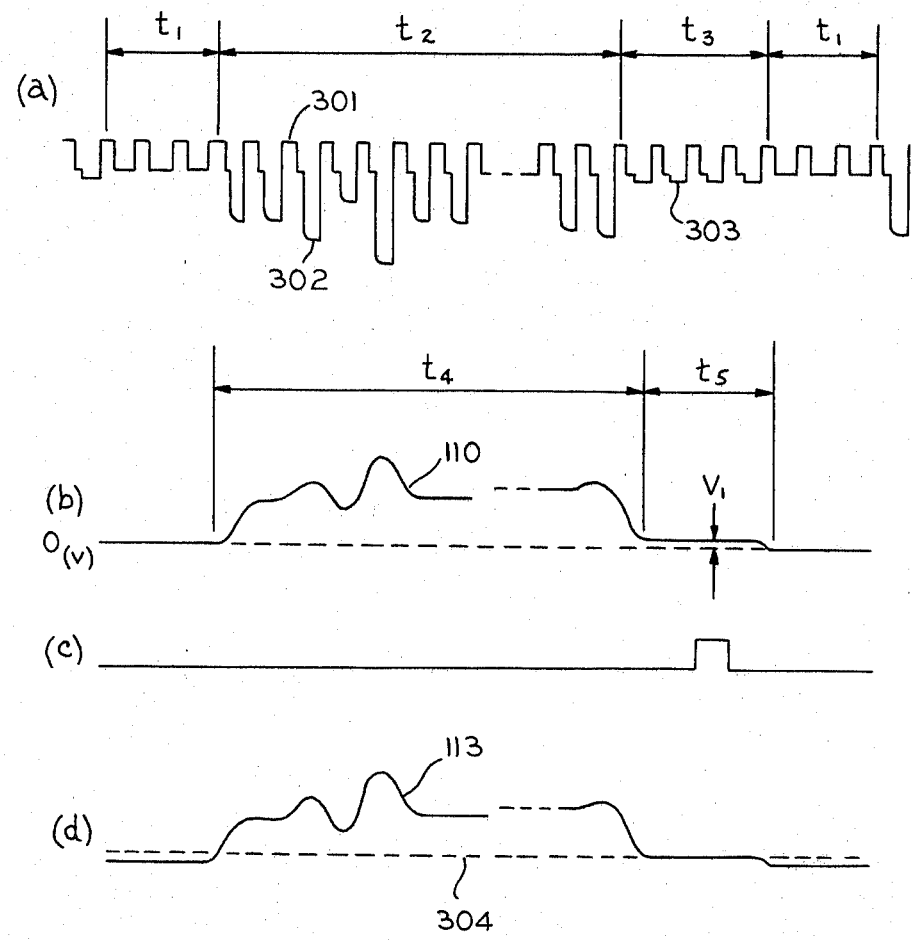

Here, if the limiting level of the limiter 120 is preset higher than the reference black level signal (303 in FIG. 3 (a)) under the condition where overflow of electric charges is not present, then under the sufficiently closed iris condition, the overflow of electric charges would disappear. Apparently the output from the CCD imaging device 105 is smaller than the maximum amplitude $V_2$ in the effective picture period $t_2$. Once the optical iris 103 closes until the overflow of electric charges ceases, thereafter conventional automatic iris control circuit 117' is effected in a manner such that the average value of the picture signal maintains at a predetermined value. In alternative construction, the control circuit 117 controls the optical iris 103 after the overflow of charges ceases and the conventional automatic iris control circuit 117' is eliminated. The control circuit 117 controls the optical riris 103 to maintain the average video signal level in the non-overflow period at the amplitude $V_6$. The average video signal level in the non-overflow period corresponds to the amplitude $V_5$ in the overflow period. Hence, the above function can be obtained easily by operating the control circuit 117 in the same manner in both the overflow and non-overflow periods.

As described in detail above, in the case where a quantity of light incident to a CCD imaging device is proper, an iris is controlled by a video signal. However, in the case where a quantity of light incident to a CCD imaging device becomes excessively large, and causes overflow occur in the CCD imaging device, the output of the CCD imaging device corresponding to a partial region, giving a limited optical black level. An optical iris is controlled by this controlled output signal.

As has been noted previously, some solid-state imaging apparatus employ a CCD imaging device which is not specifically provided with a partial region for giving an optical black level. They employ a known alternative such that, after an electric charge has been transferred from the last picture element in the direction of horizontal scanning, an idle transfer is effected in the horizontal transfer section. An output corresponding to a dark current component is obtained in the horizontal transfer section. This idle transfer signal is employed as the optical black level signal for the video signal. The control method according to the present invention can be practiced equally well in this application.

While the limiter 120 is disposed in front of the preamplifier 109 in the above-described preferred embodiment, exactly the same effect can be achieved if the limiter 120 is disposed behind the preamplifier 109.

In addition, while the above description was made with respect to a monochromatic solid-state imaging apparatus employing a single CCD imaging device, the present invention should not be limited to such apparatus. It can be applied to a color imaging apparatus or monochromatic imaging apparatus employing a plurality of CCD imaging devices of single-plate type, two plate type or three-plate type. The malfunctions in the automatic iris control means in the prior art can be prevented with a similar circuit construction.

What is claimed is:

1. A solid-state imaging apparatus comprising: optical iris means; CCD imaging means responsive to light transmitted from an object through said optical iris means for outputting a picture signal component and a reference black level signal component; limiter means for limiting said reference black level signal component within the output from said CCD imaging means to a first predetermined amplitude, said first predetermined amplitude being equal to or larger than the amplitude of said reference black level signal component under the condition that electric charges generated by said light-sensitive elements within said CCD imaging means in response to the light transmitted from the object do not overflow from said light-sensitive elements, said first predetermined amplitude being smaller than the amplitude of said reference black level signal component under the condition that said electric charges do overflow from the light-sensitive elements; clamp circuit means for clamping the level of said reference black level signal component processed by said limiter means to a predetermined black level; means for deriving a video output signal from the output of said clamp circuit; and control circuit means for closing said optical iris means when the amplitude of the signal corresponding to said picture signal component within the output of said clamp circuit means is equal to or larger than a second predetermined amplitude.

2. The solid-state imaging apparatus claimed in claim 1, wherein said second predetermined amplitude is equal to 25 to 50% of the amplitude of said picture signal component among the output from said clamp circuit means under the condition where electric charges generated in the light-sensitive elements of said CCD imaging device overflow from said light-sensitive elements.

3. The solid-state imaging apparatus claimed in claim 1 or 2, wherein the output from said CCD imaging means is applied to said clamp circuit means through a low-pass filter means.

4. The solid-state imaging apparatus claimed in claim 3, wherein said CCD imaging means is an interline transfer type imaging device.

5. The solid-state imaging apparatus claimed in claim 3, wherein said CCD imaging means is a frame transfer type imaging device.

6. A method for providing automatic iris control in a solid-state imaging apparatus using a charge transfer image device having a plurality of light sensitive elements, said charge transfer imaging device producing an output signal including a first signal responsive to an optical signal and a second signal which is used for producing a reference level of a video signal, and an optical iris responsive to said output signal from said charge transfer imaging device for controlling a quantity of light incident to said charge transfer imaging device, said method comprising the steps of:

(a) limiting the amplitude of said second signal to a level which is lower than the amplitude of said first signal, when electric charges exceed a maximum quantity of electric charges which can be stored in said light-sensitive elements of said charge transfer imaging device, whereby the excessive electric overflow from said light-sensitive elements, and (b) controlling said optical iris responsive to said output signal obtained after the amplitude of said limited second signal so that said optical iris may be closed until said overflow of said electric charges ceases.

7. A method for automatic iris control in a solid-state imaging apparatus as claimed in claim 6, in which when said second signal has an amplitude equivalent to a dark current component, said optical iris is controlled so that said video signal may have a substantially constant value.

8. A control circuit for regulating the amount of light in an image on a solid state imaging device, said control circuit comprising a plurality of light sensitive means, each of said light sensitive means storing and releasing photocharges which are proportional to the amount of light in said image thereon, means responsive to said photocharges for producing a video signal and a reference signal, each of said light sensitive means having a limited charge storage capacity, said reference signal being related to the charge storage capacity of said light sensitive means, means responsive to the amplitude of said reference signal exceeding the amplitude of a black level signal for limiting said reference signal to a predetermined level which is lower than the amplitude of said video signal, and means for reducing the amount of light in said image on said imaging device responsive to the level of said video signal exceeding said limited reference signal.

9. The control circuit claimed in claim 8 further comprising a means for controlling the amount of light in the image falling on the imaging device in a manner which maintains the average value of the video signal at a predetermined value.

10. The control circuit claimed in claim 8 or 9 further comprising an optical iris means positioned between the light sensitive means and the source of light.

11. The control circuit claimed in claim 8 is further comprising a clamp circuit means for clamping the level of the reference signal to coincide with a predetermined level and thereby provide a control upon said video signal to maintain a predetermined level.

12. The control circuit claimed in claim 11 which is further comprising a second processing circuit means for providing gamma correction, white clipping, black clipping, blanking signals and synchronizing signals.

13. The control circuit claimed in claim 8 further comprising a first processing circuit means having a preamplifier and a low-pass filter.

14. The control circuit according to claim 8 wherein the means for reducing the amount of light in the image on the imaging device responds to the level of said video signal reaching a level exceeding approximately 25% to 50% of the overflow level of the charge storage capacity of the light sensitive means.

15. The control circuit according to claim 8 wherein the solid state imaging device is an interline transfer type imaging device.

16. The control circuit according to claim 8 wherein the solid state imaging device is a frame transfer type imaging device.

* * * * *